No. 741,881. PATENTED OCT. 20, 1903.
G. E. BRIGHT.
DEVICE FOR MEASURING IRREGULAR OBJECTS.
APPLICATION FILED JAN. 2, 1903.
NO MODEL. 3 SHEETS—SHEET 1.
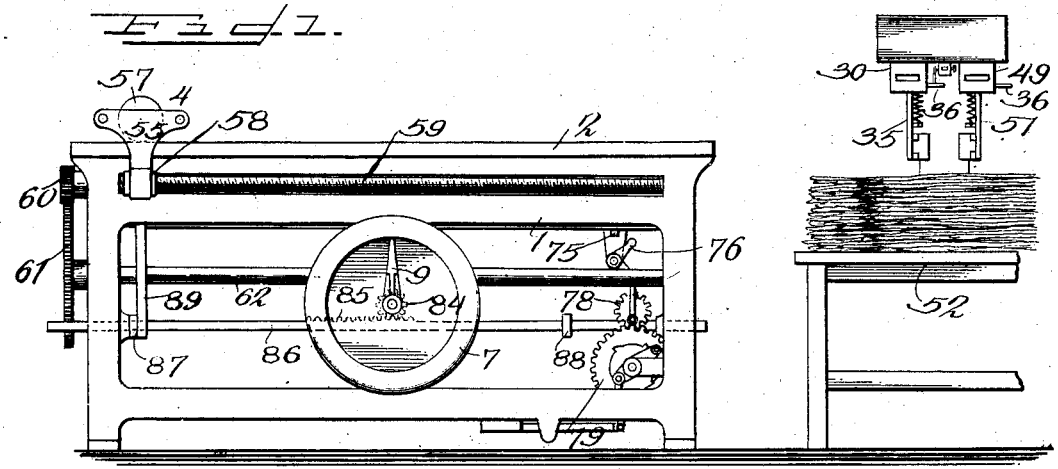
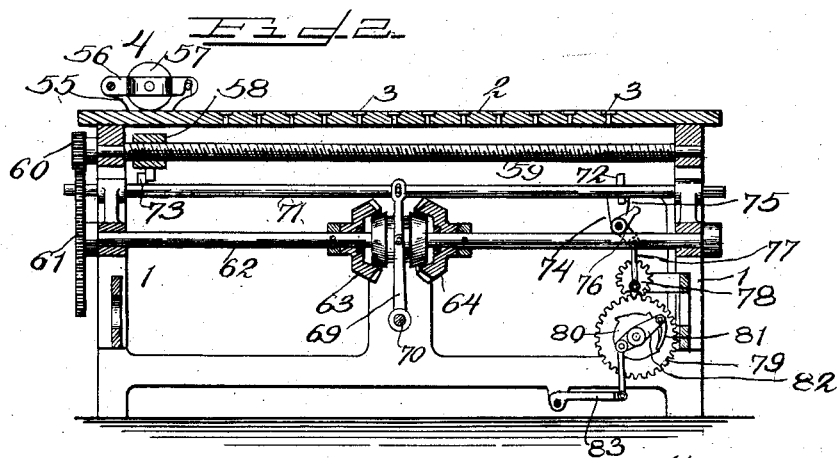
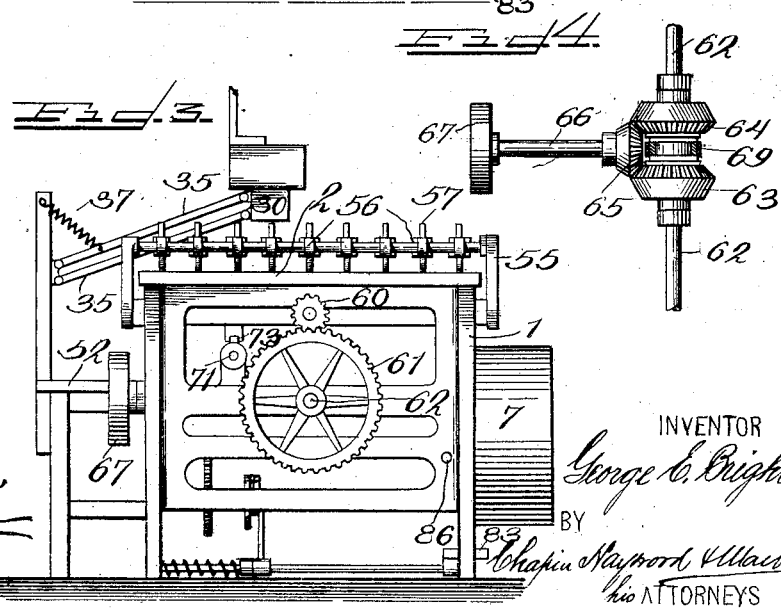
WITNESSES:
INVENTOR
George E. Bright
BY
his ATTORNEYS No. 741,881. PATENTED OCT. 20, 1903.
G. E. BRIGHT.
DEVICE FOR MEASURING IRREGULAR OBJECTS.
APPLICATION FILED JAN. 2, 1903.
NO MODEL. 3 SHEETS—SHEET 2
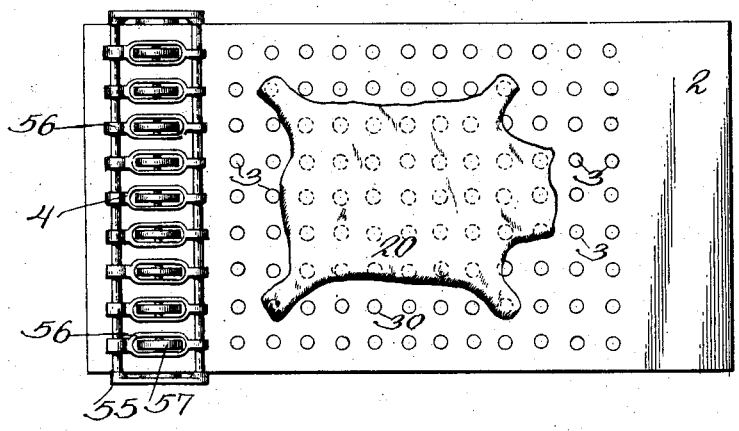
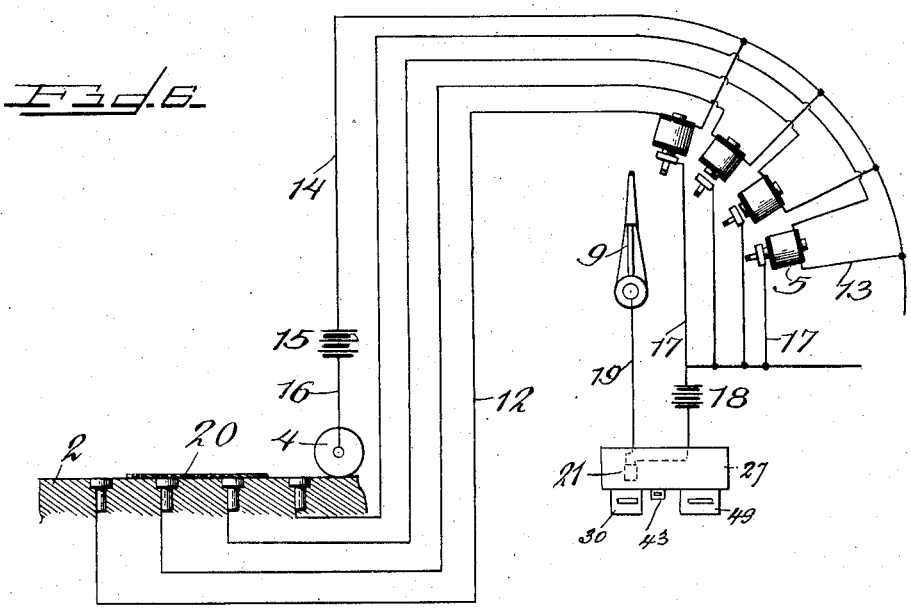
WITNESSES:
INVENTOR
George E. Bright
BY
Chapin Hayward & Marble
his ATTORNEYS No. 741,881. PATENTED OCT. 20, 1903.
G. E. BRIGHT.
DEVICE FOR MEASURING IRREGULAR OBJECTS.
APPLICATION FILED JAN. 2, 1903.
NO MODEL. 3 SHEETS—SHEET 3.
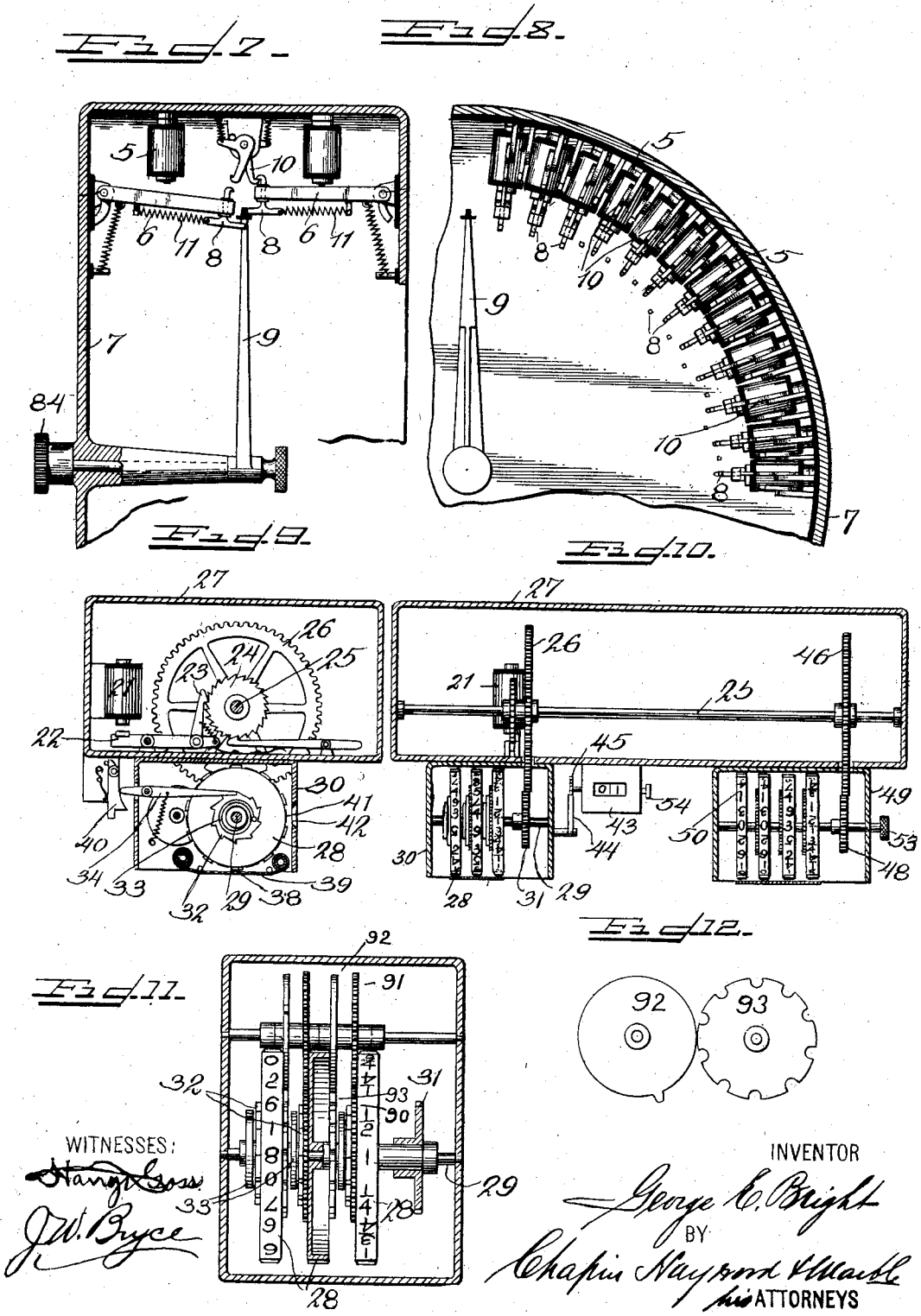

No. 741,881. Patented October 20, 1903.

UNITED STATES PATENT OFFICE.

GEORGE E. BRIGHT, OF MAPLEWOOD, NEW JERSEY.

DEVICE FOR MEASURING IRREGULAR OBJECTS.

SPECIFICATION forming part of Letters Patent No. 741,881, dated October 20, 1903.

Application filed January 2, 1903. Serial No. 137,422. (No model.)

*To all whom it may concern:*

Be it known that I, GEORGE E. BRIGHT, a citizen of the United States of America, residing at Maplewood, county of Essex, State of New Jersey, have invented certain new and useful Improvements in Devices for Measuring Irregular Objects, of which the following is a specification, reference being had to the accompanying drawings, forming a part thereof.

My invention relates to improvements in devices for measuring irregular objects and registering the measurements so made.

My invention consists in the provision of a plurality of electrical contacts disposed at predetermined distances apart upon a table or the like arranged to receive an object to be measured, a circuit-closer adapted to travel over all the contacts and electrically connect those contacts not covered by the said object, and in means for registering the number of contacts so covered by the said object. If the said contacts be arranged equidistantly apart, it follows that each contact will represent a unit of area which may be any desired amount according to the distance between the various contacts. This unit of area may, for instance, be a quarter of a square foot, in which case an object covering forty of these contacts would have a superficial area of substantially ten square feet. If then mechanism be provided for determining the total of the contacts covered by an object during the measuring operation, such total will correctly represent the superficial area of the said object. The totals so determined may of course be registered in any system of measurement desired, according to the character of the registering or numbering characters employed. My invention includes a device for thus registering and recording the superficial area of each object measured, means for registering and recording the total area of a number of objects so measured, and means for registering the number of objects included in such total.

The objects of my invention are to simply, quickly, and correctly measure the superficial area of irregular objects—such as hides, skins, and the like—and to register and record such measurement, to register and record the total area of a plurality of objects so measured, and to register the number of objects included in such total.

My invention further consists in certain details of construction and combination of parts, as fully set forth in the following specification, and other advantages accruing from my invention will appear hereinafter.

I will now proceed to describe an apparatus embodying my invention and will then point out the novel features in claims.

In the drawings, Figure 1 is a front elevation of an apparatus embodying my invention. Fig. 2 shows a central vertical longitudinal section through the measuring instrument. Fig. 3 is an end view of the apparatus shown in Fig. 1. Fig. 4 shows a detail top view of certain portions of the driving mechanism and reversing-clutch employed. Fig. 5 is a top view of the measuring instrument. Fig. 6 is a diagrammatic view showing the electrical connections between the contacts of the measuring instrument and certain electrically-operated devices and the electrical connections between such devices and the registering mechanism. Fig. 7 shows a partial transverse section through certain portions of the measuring instrument, including certain of the electrically-operated devices referred to in the description of Fig. 6. Fig. 8 shows a detail view, partially in section, of the parts shown in Fig. 7 from a point of view at right angles to the point of view of Fig. 7. Fig. 9 shows a partial cross-sectional end view and partial side elevation of the registering and recording mechanism. Fig. 10 shows a partial longitudinal section and partial front elevation of same. Fig. 11 shows a horizontal section of certain portions of the registering and recording mechanism. Fig. 12 shows a detail view of certain gearing employed therein.

In the apparatus herein I have shown a measuring instrument having a suitable framework 1, supporting a flat top or table 2. The top 2 may conveniently be formed of wood or other electrically non-conductive material and is provided with a plurality of electrical contacts 3, insulated from each other and suitably spaced apart, as shown more particularly in Figs. 2 and 5. A circuit-closer 4 is arranged to travel over the top of the table 2 and (provided nothing is interposed between the table and the circuit-closer) to engage all of the contacts 3 and to close circuit electrically therethrough. If an object itself of electrically non-conductive material be placed upon the table so as to cover a certain number of contacts or otherwise interposed between the table and the member comprising the circuit-closer 4, the said circuit-closer in its movement over all of the contacts 3 will close only such contacts 3 as are not covered by the object to be measured. Certain devices are employed, as will presently be explained, to register the number of contacts covered by the object to be measured, or, in other words, the number of contacts failed to be closed by the circuit-closer in its movement over all the said contacts. A registry of the number of these contacts multiplied by the unit of area controlled by a single contact will give the superficial area of the object to be measured. In the device herein each contact 3 is in electrical connection with an electromagnet 5, there being one electromagnet for each contact 3. Each electromagnet 5 is provided with an armature 6, suitably pivoted and mounted within a casing 7, suitably supported upon the framework 1. Each armature 6 is provided with a contact-dog 8, arranged in the path of movement of a swinging arm 9. In the upper position of the armatures 6 the contact-dogs 8 are adapted to engage a retaining-pawl 10, and in this position the said dog is arranged in the path of movement of an insulated portion of the swinging arm 9, so that when the swinging arm comes in contact with the contact-dog in its movement there will be no electrical connection between the swinging arm and the said dog. When an armature 6 is in its released position, the contact-dog 8 will be in the path of the electrically-conductive portion of the swinging arm 9, and electrical connection will be established between the dog and the said swinging arm. The contact-dogs 8 are pivotally mounted in their respective armatures and are capable of certain rotative movements with respect thereto in either direction. They are maintained in a normal position substantially in a line with their respective armatures by means of springs 11, such springs tending always to return them to their normal position when moved away therefrom in either direction. As before stated, the coils of the electromagnets 5 are connected, respectively, with the contacts 3, and certain of such connections are shown diagrammatically by wires 12 in Fig. 6. The return-wires of said coils are connected by branch wires 13 in multiple with a common return-wire 14 to one pole of a generator 15. The other pole of the generator is connected by a wire 16 to the circuit-closer 4. The armatures of the electromagnets 5, together with their contact-dogs, are all connected in multiple through branch wires 17 to one pole of a generator 18. The other pole of the said generator 18 is connected with the actuating device of the registering mechanism and from thence circuit passes through a wire 19 to the swinging arm 9. By this it will be understood that in making a single revolution the arm 9 will be caused to close circuit to send a succession of impulses through the actuating device of the registering mechanism once for each contact-dog 8 at that time in the path of movement of the electrically-conductive portion of the said arm. The arm 9 will be caused to make one complete revolution for every time the circuit-closer 4 is caused to travel from one end of the table 2 to the other. The normal position of the armatures 6 of the electromagnets 5 is in a released position and with the contact-dogs carried thereby in the path of movement of the electrically-conductive portion of the arm 9. When the circuit-closer 4 is caused to move from one end of the table to the other over all of the contacts 3, it will close circuit through all of such contacts as are not at such time covered by the object to be measured. The electromagnets 5 in connection with all of those contacts 3 through which circuit is closed will attract their armatures 6, so as to cause the upper portion of their contact-dogs 8 to be caught by their retaining-pawls 10. Deënergization of the electromagnets 5 by the circuit-closer passing beyond the contacts connected thereto will not cause the armatures thereof to be released because of such engagement with their retaining-pawls 10, and the said armatures will be held in their attracted position and with their respective contact-dogs 8 in the path of movement of the insulated portion of the arm 9, but out of the path of movement of the electrically-conductive portion thereof. In making a complete revolution the arm 9 will not only electrically contact with each contact-dog 8 at such time in the path of movement of its electrically-conductive portion, but will also engage the dogs of those armatures at such time in their attracted position and will thereby slightly rotate such contact-dogs to cause same to disengage their retaining-pawls 10, so that their armatures may fall back to their released positions after the arm has passed by them. Such contact-dogs being engaged only by the insulated portion of the arm 9, there will be no electrical connection made therethrough, and the arm 9 will pass along without closing circuit until it again meets the contact-dog of an armature in its released position. An impulse will thus be given to the registering mechanism during a revolution of the arm 9 for every contact 3 covered by an object to be measured.

In Fig. 5 and diagram Fig. 6 I have shown at 20 an object to be measured in position upon the table 2 and covering a certain number of the contacts 3. In Fig. 5 the contacts so covered are shown in dotted outline.

The registering mechanism may conveniently comprise a device known in the art as an "electrical single-impulse adder," in which each electrical impulse of whatever duration transmitted through the actuating mechanism thereof represents a single uniform unit of movement, and I have shown such device in detail in Figs. 9, 10, 11, and 12. The actuating device for such mechanism comprises an electromagnet 21, located in the circuit of the generator 18, an armature 22, an actuating-pawl 23, and a ratchet-wheel 24. The ratchet-wheel 24 is mounted upon a shaft 25, carrying a driving gear-wheel 26. The electromagnet 21, armature 22, actuating-pawl 23, ratchet-wheel 24, shaft 25, and driving-wheel 26 are all mounted in a suitable fixed casing 27, suitably supported in any desired manner. A plurality of registering and printing wheels 28 are mounted upon a shaft 29, secured within a casing 30. The registering-wheels 28 are driven by means of a pinion 31, suitably supported upon the shaft 29 and arranged to mesh with the drive-wheel 26, and suitable crossover-gearing 90 91 92 93 of a type common to adding-machines is provided, such gearing requiring no specific description herein as forming no part of this present invention. The registering-wheels 28 are provided with a ratchet-wheel 32, and a coiled spring 33 is connected at one end to the said ratchet-wheel and at the other end to a relatively stationary portion of the device. A trip-pawl 34 normally engages the teeth of said ratchet-wheel and overcomes any tendency of the registering-wheels to return to their normal positions until it is desired that they shall do so. The casing 30 is supported by two parallel rods 35 and is capable of movement toward and away from the fixed casing 27. The said casing 30 may be provided with a suitable handle 36, by which it may be so moved up and down, and a spring 37 normally tends to keep the said casing up in engagement with the fixed casing 27. When the said casing 30 is in its upper position, (in which position it is shown in the drawings,) the pinion 31 upon its shaft 29 will be in engagement with the drive-wheel 26 and will be operated thereby. When the said casing 30 is moved down away from the fixed casing 27, the pinion 31 will be released from engagement with the drive-wheel 26; but the registering-wheels will be retained in the positions to which they have been moved by the engagement of the pawl 34 with the ratchet-wheel 32. The registering-wheels 28 are preferably provided with projecting numbers 38, raised from the outer periphery of the wheels 28 and reversed, so that they may be employed as printing characters. Suitable inking mechanism 39 may be provided, so that when the casing 32 and parts carried thereby are moved downward they may print the numbers registered by the registering-wheels 28, and thus form a permanent record. In the return of the casing 30 and the parts carried thereby the pawl 34 will be engaged by a trip 40, which will cause it to momentarily release the ratchet-wheel 32 to permit the registering-wheels to return to their normal positions. In the final upward movement the pinion 31 will be caused to again engage the drive-wheel 26, so that in future operations of the actuating mechanism the registering-wheels will be again caused to register the number of impulses transmitted through the electromagnet 21. The registering-wheels 28 may also be provided with numbers 41, which may read the right way, but will not project outward so far as the numbers 38. These numbers may be viewed through a window 42 in the casing 30, and the numbers 41 opposite window 42 will be arranged to correspond with the numbers 38 at that moment in the printing position. Thus the numbers registered by the registering-wheels 28 may be viewed through the window 42, while the registering-wheels will be in a position to at such time print the numbers corresponding to those so viewed.

At 43 I have shown a small units-adder, which may be operated by means of a knocker 44, secured to the side of the casing 30, and a spider 45, carried by the adder 43. The adder 43 is provided for the purpose of registering the number of consecutive measuring operations in a series, and thus may be operated by any portion which moves once for each operation. For convenience of illustration and description I have shown the adder as being arranged to register the number of times the casing 30 is moved downward and returned, but do not, of course, desire to be limited to such construction and arrangement.

The shaft 25 in the casing 27 may also carry a second drive-wheel 46, which may be normally in engagement with a pinion 47 upon a shaft 48 within a casing 49 similar to the pinion 31 upon the shaft 29 within the casing 30. The casing 49 may support registering-wheels 50 similar to the registering-wheels 28, which may be employed as a total-adder to continuously add the total of a series of registries indicated by the registering-wheels 28. The casing 49 is mounted upon parallel rods 51 similar to the rods 35, supporting the casing 30.

The above-described registering devices are arranged above a table 52, upon which the objects measured upon the measuring-table 2 may be placed after they have been so measured. In the operation of my device these objects may be placed one by one upon the table 52 immediately after the operation of measuring, and the measurement thereof may be recorded directly upon the objects themselves by the depression of the casing 30, carrying the registering-wheels 28. At each reciprocation of this casing an impulse will be given to the adder 43, and so the number of objects thus measured will be registered by said adder. At each downward and return movement of the casing 30 the registering-wheels 28 will, as before stated, return to their normal positions, and hence at each operation the measurement only of the particular object just mentioned will be printed upon such object. During this time, however, the registering-wheels 50 within the casing 49 will be making a total addition of all the objects measured, because its pinion 48 will have remained in mesh with the drive-wheel 46 upon the drive-shaft 25. Therefore at the end of a series of operations the total measurement of a plurality of objects measured will be registered by the registering-wheels 50 and may be recorded by a reciprocation and consequent printing operation of the said total-adder. Any suitable means may be provided to return the registering-wheels 50 to their normal positions after a recording operation and before the pinion 47 is returned in mesh with the drive-wheel 46, and for such purpose I have shown a hand-wheel 53, by which the registering-wheels may be so returned by hand when desired. Similarly I have shown a hand-wheel 54 upon the units-adder 43, by which it may be returned to a normal position after reading has been taken therefrom and it is desired to commence to measure a new batch of objects 20.

A measuring operation may of course take place by a movement of the circuit-closer 4 from one end of the table 2 to the other in either direction, and this operation may be made by hand, if desired. I have, however, shown mechanical devices for causing the circuit-closer to so move in order to make the whole machine practically automatic. The member, including the circuit-closer 4, comprises a carriage 55, supporting above the table-top 2 a plurality of yokes 56, carrying contact-rollers 57, and connected beneath the table by a bar carrying a nut 58. A lead-screw or worm-shaft 59 is mounted beneath the table-top in suitable bearings upon the framework 1 and engages the said nut 58. One of the journals of the lead-screw 59 is extended and carries a pinion 60, meshing with a spur-wheel 61. The spur-wheel 61 is mounted upon a shaft 62, journaled in suitable bearings upon the framework 1 and provided with two bevel gear-wheels 63 64. The bevel gear-wheels 63 and 64 are loosely mounted upon the shaft 62 and are arranged in mesh with a bevel gear-pinion 65, rigidly mounted upon a drive-shaft 66, journaled in the frame at right angles to the shaft 62. The shaft 66 carries a drive-pulley 67, by which the said shaft may be conveniently driven by a belt connection in a manner well known. A clutch member 68 is splined upon the shaft 62 and is capable of limited longitudinal movement with respect to the said shaft, but permanently rotates therewith. The clutch member may be moved longitudinally by means of a shipping-lever 69, pivoted to the framework 70 and engaging at its upper end a shipper-bar 71. In the position of the parts shown in Fig. 2 the shipper-bar 71, shipping-lever 69, and clutch member 68 are in an intermediate position, and when in such position the shaft 62 will not revolve even though the drive-shaft 66 be revolving continuously. Bevel gear-wheels 63 and 64 will, however, revolve in opposite directions loosely upon the shaft 62. By shifting the shipper-bar 71 to the left the clutch member 68 will be caused to engage with the bevel gear-wheel 63, and the shaft 62 will be rotated in such a direction as to cause the carriage 55, including the circuit-closer 4, to travel from the end of the table at which it is shown in the drawings to the opposite end. As the carriage 55 nears the opposite end the nut 58, carried thereby, will engage a projection 72 upon the shipper-bar and will move the same until it returns the said bar and clutch member 68 to their intermediate positions to release the clutch member 68 from engagement with the bevel gear-wheel 63. The shaft 62, lead-screw 59, and carriage 55 will then remain stationary until the shipper-bar 71 is moved toward the right to cause engagement of the clutch member 68 with the bevel gear-wheel 64, when the shaft 62 will be rotated in the opposite direction to return the carriage 55 to its original position at the left-hand side of the machine, when the clutch member will be again returned to its normal intermediate position by engagement of the nut 58 with a projection 73 upon the shipper-rod 71, similar to the projection 72, before described. The shipper-bar 71 may be moved in one direction or the other, to start a movement of the carriage, by hand, if desired, or suitable means may be provided for doing so mechanically. I have shown means herein in a knocker 75 on the under side of the shipper-bar 71, which knocker is connected through a short lever 76 and a connecting-rod 77 with a pin eccentrically mounted upon a pinion 78, meshing with a spur-gear 79. The spur-gear is actuated by means of a ratchet-wheel 80, attached thereto, and a pawl 81, carried by a lever 82, connected to a treadle 83. Each depression of the treadle 83 will cause a partial rotation of the spur-gear 79 sufficient to rotate the pinion 78 one-half a revolution. This will cause the knocker 74 to swing from one side to the other of a vertical line passing through its axis of movement. At its extremity of movement the knocker 74 is just out of the path of movement of the projection 75 of the shipper-rod 71; but when operated the said knocker, passing through a curved path, will engage the said projection 75 and move the shipper-rod in one direction or the other in accordance with its direction of movement. Thus it will be seen that by merely depressing the treadle 83 the shipper-rod will be thrown always in the proper direction to start the carriage moving from the position to which it was last moved to the opposite position and that the completion of the movement of the carriage will not only stop the driving movement thereof, but will reset the shipper-rod, so as to be again in position for engagement by the tripping mechanism. By reference particularly to Figs. 2 and 5 it will be seen that the carriage has a certain amount of movement after the circuit-closer has passed over all of the contacts 3. Means are provided during the movement of the carriage in either direction for causing the swinging arm 9 to make a complete revolution. For this purpose the swinging arm 9 is provided with a gear-pinion 84, arranged in mesh with gear-teeth 85 of an operating-rod 86. The operating-rod 86 is mounted to slide in suitable slideways in the framework 1 and is provided with two collars 87 88. The collars 87 and 88 are arranged to be engaged by an extension 89 of the carriage 55 in its movement. The movement imparted to the rod 86 is arranged to be sufficient to give the arm 9 a complete revolution. It will be seen that the arm 9 is caused to revolve in opposite directions, in accordance with which direction the carriage 55 is moving; but it will be noted that the contact-dogs 8, with which the swinging arm 9 is arranged to engage, may be engaged by movement in either direction of the swinging arm 9, and hence the direction of movement thereof is unimportant.

It will be understood, of course, that I do not desire to be limited only to the details of construction and combination of parts herein shown and described, as the same are obviously capable of many modifications within the spirit and scope of my invention and that certain parts of my invention may be used with other parts of different construction than herein shown and described.

What I claim is—

1. In a device for measuring irregular objects, the combination with a plurality of electrical contacts disposed in a plurality of longitudinal and transverse series, of a registering device operated to register a total governed by the number of contacts closed during a measuring operation, and means, governed by the object to be measured in accordance with its size, for closing circuit through certain of said contacts.

2. In a device for measuring irregular objects, the combination with a plurality of electrical contacts disposed in a plurality of longitudinal and transverse series, and a circuit-closer adapted to close electric circuit therethrough, of means for cutting out certain of said contacts by the object to be measured, and means for registering the total of the contacts so cut out.

3. In a device for measuring irregular objects, the combination with two members adapted to engage an object to be measured, of a plurality of electrical contacts disposed in a plurality of longitudinal and transverse series, carried by one of said members, and adapted to be covered by an object during the measuring operation, a circuit-closer, carried by the other said member, adapted to close circuit through those contacts of the first said member not so covered, and means for registering the total of the contacts so covered by the object.

4. In a device for measuring irregular objects, the combination with two members adapted to engage an object to be measured, of a plurality of electrical contacts disposed in a plurality of longitudinal and transverse series, carried by one of said members, and adapted to be covered by an object during the measuring operation, a circuit-closer, carried by the other said member, adapted to close circuit through those contacts of the first said member not so covered, and adding mechanism, controlled by said contacts, for determining the total of the contacts so covered during each measuring operation.

5. In a device for measuring irregular objects, the combination with two members adapted to engage an object to be measured, of a plurality of electrical contacts carried by one of said members, and adapted to be covered by an object during the measuring operation, a circuit-closer, carried by the other said member, adapted to close circuit through those contacts of the first said member not so covered, adding mechanism, controlled by said contacts, for determining the total of the contacts so covered during each measuring operation, and means for making a permanent record of such total upon the object measured.

6. In a device for measuring irregular objects, the combination with a table having a plurality of electrical contacts disposed in series both transversely and longitudinally thereof, said contacts adapted to be covered by an object supported upon the table during a measuring operation, of a circuit-closer adapted to close circuit through those contacts not so covered, and means for registering the total of the contacts so covered by the object.

7. In a device for measuring irregular objects, the combination with a table having a plurality of electrical contacts disposed in series both transversely and longitudinally thereof, said contacts adapted to be covered by an object supported upon the table during the measuring operation, of a circuit-closer including rollers adapted to roll over said table and to close circuit electrically through those said contacts not covered by an object during the measuring operation, and adding mechanism controlled by said contacts for determining the total of the contacts so covered during the movement of the circuit-closer thereover.

8. In a device for measuring irregular objects, the combination with a supporting member having a superficial area not less than that of an object to be measured and having electrical contacts disposed over such area in a plurality of series both transversely and longitudinally thereof, said contacts adapted to be covered by an object during the measuring operation, of a circuit-closer adapted to close circuit through those contacts not so covered in the measuring operation, and means for registering the total of the contacts so covered by the object.

9. In a device for measuring irregular objects, the combination with a plurality of electrical contacts adapted to be covered by an object during the measuring operation, each contact representing a certain unit of area, of an electrical single impulse-adder, reciprocating operating means therefor, and means intermediate the contacts and the said adder for imparting an electrical impulse to the said operating means once for each contact so covered during a measuring operation.

10. In a device for measuring irregular objects, the combination with two members adapted to engage an object to be measured, of a plurality of electrical contacts carried by one of said members, and adapted to be covered by an object during the measuring operation, a circuit-closer, carried by the other said member, adapted to close circuit through those contacts of the first said member not so covered, adding mechanism, controlled by said contacts, for determining the total of the contacts so covered during each measuring operation, means for recording such total, adding mechanism for determining the total of the contacts covered during a plurality of measuring operations, and means for recording such total.

11. In a device for measuring irregular objects, the combination with two members adapted to engage an object to be measured, of a plurality of electrical contacts carried by one of said members, and adapted to be covered by an object during the measuring operation, a circuit-closer, carried by the other said member, adapted to close circuit through those contacts of the first said member not so covered, electromagnets in circuit with said electrical contacts, a movable member controlling adding mechanism, devices controlled in their movement by said electromagnets to move in the path of movement of said movable member, and adding mechanism controlled by said movable member in its movement in accordance with the positions of the said movable devices.

12. In a device for measuring irregular objects, the combination with two members adapted to engage an object to be measured, of a plurality of electrical contacts carried by one of said members, and adapted to be covered by an object during the measuring operation, a circuit-closer, carried by the other said member, adapted to close circuit through those contacts of the first said member not so covered, electromagnets in circuit with said electrical contacts, armatures controlled thereby carrying electrical contacts, a circuit-closer adapted in its movement to electrically engage, or fail to engage, the contacts carried by said armatures, an electrically-operated adding mechanism operated at each pulsation through the last-named circuit-closer.

13. In a device for measuring irregular objects, the combination with a support for an object to be measured, provided with a plurality of electrical contacts certain of which are adapted to be covered by the object so supported according to its size, of a circuit-closer comprising a carriage and a roller adapted to move with respect to said support and to travel over said contacts and over the object to be measured and to close circuit electrically through those said contacts not covered by the said object, adding mechanism controlled by said contacts for determining the total of the contacts so covered during a movement of the circuit-closer thereover, and means for automatically stopping the movement of the circuit-closer after it has traveled over all of the said contacts to complete a measuring operation.

14. In a device for measuring irregular objects, the combination with a table or support 2, for an object to be measured, having a plurality of electrical contacts 3, of a circuit-closer 4, adapted to travel over said support and to close electrical circuit through those contacts 3 which are not covered by an object supported upon the table 2 at such time, electromagnets 5 in circuit with said electrical contacts 3, adding mechanism comprising registering-wheels 28, and actuating means therefor, and means for operating said actuating means in accordance with the number of contacts 3 closed by the circuit-closer 4.

15. In a device for measuring irregular objects, the combination with a plurality of electrical contacts adapted to be covered by an object during a measuring operation, each contact representing a certain unit of area, of means controlled by the contacts for registering the area represented by the total of the contacts covered during a measuring operation, and means for recording such total upon the object measured.

16. In a device for measuring irregular objects, the combination with a plurality of electrical contacts adapted to be covered by an object during a measuring operation, each contact representing a certain unit of area, of means controlled by the contacts for registering the area represented by the total of the contacts covered during a measuring operation, said means including numbering-wheels, and means for printing the area registered by the numbering-wheels, upon the object measured.

17. In a device for measuring irregular objects, the combination with a plurality of electrical contacts adapted to be covered by an object during a measuring operation, each contact representing a certain unit of area, of means controlled by the contacts for registering and recording the area represented by the total of the contacts covered during a measuring operation, and means for registering and recording the area represented by the total of the contacts covered during a plurality of consecutive measuring operations.

In witness whereof I have hereunto set my hand this 27th day of December, 1902.

GEORGE E. BRIGHT.

Witnesses:
D. HOWARD HAYWOOD,
C. F. CARRINGTON.